Sept. 30, 1958    L. H. LIGHT    2,854,614
TRANSISTOR CIRCUIT ARRANGEMENT HAVING STABILIZED OUTPUT VOLTAGE
Filed Oct. 10, 1955
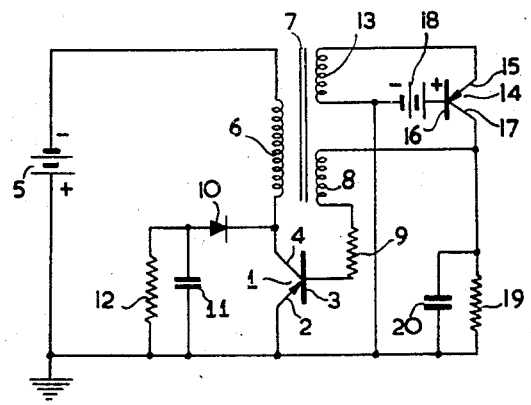
INVENTOR
LEON HENRY LIGHT
BY
AGENT

United States Patent Office 2,854,614
Patented Sept. 30, 1958

2,854,614

TRANSISTOR CIRCUIT ARRANGEMENT HAVING STABILIZED OUTPUT VOLTAGE

Leon Henry Light, London, England, assignor, by mesne assignments, to North American Philips Company, Inc., New York, N. Y., a corporation of Delaware Application October 10, 1955, Serial No. 539,631

Claims priority, application Great Britain October 11, 1954

3 Claims. (Cl. 321—2)

The invention relates to circuit arrangements for providing a stabilized direct voltage with the aid of a transistor, the collector and base of which are coupled back by means of a transformer and of means for rectifying the oscillator oscillations.

In prior U. S. patent applications, Serial Nos. 509,894, filed May 20, 1955, now Patent No. 2,791,739, and 442,774, filed July 12, 1954, oscillators are described in which during the forward stroke a saw-tooth current flows via the collector of a transistor through an inductance and is abruptly cut-off, a voltage peak being produced across the inductance during the fly-back and being then rectified. An embodiment of such a circuit arrangement contains a pnp junction transistor the emitter of which is connected to the positive terminal of a direct voltage supply source whilst its collector is connected through the primary winding of a transformer to the negative terminal of the said source and the secondary of said transformer is connected in series with a resistance between the base and the emitter. When the transformer is cut off, negative voltage peaks are produced across the primary of the transformer and may reach an amplitude many times as large as the supply voltage. Said voltage peaks are subsequently supplied through a rectifier to a filter and finally provide a direct voltage for supplying to a load. This circuit arrangement has the disadvantage that the effective voltage applied to the load varies according to the value of the load resistance and/or of the supply voltage.

It is an object of the invention to obviate this disadvantage and to stabilize the output direct voltage of the circuit arrangement against variations in the supply voltage and/or the value of the load resistance. In accordance with the invention, a circuit arrangement of the aforesaid type comprises an auxiliary junction transistor having emitter, collector and base electrodes and a source of reference voltage connected in series circuit arrangement with an auxiliary winding of the transformer in the emitter-base circuit of the auxiliary transistor. The oscillation voltage appearing across the auxiliary winding is compared with the voltage of the reference voltage source by means of the emitter-base junction of the auxiliary transistor, and the emitter-collector current of the auxiliary transistor is controlled in accordance with the result of such comparison. The emitter-collector current of the auxiliary transistor provides a voltage for biasing the transistor oscillator to control the oscillations and to maintain the oscillation voltage substantially constant.

In such a circuit arrangement the oscillation voltage to be compared with the reference voltage and delivered by the auxiliary winding of the transformer has a predetermined relationship with the output voltage. This method frequently has advantages over the method in which a voltage to be compared with a reference voltage is derived from the direct voltage output circuit, particularly when the load due to the connection of the stabilizing circuit to the output circuit would be excessive.

In circuit arrangements in accordance with the present invention, the voltage set up across the auxiliary winding of the transformer during the discharge or cut-off periods is proportional to the output voltage, if the voltage drop in the rectifier and in the resistance of the output winding of the transformer is neglected. However, this voltage drop is normally small and may be neglected if the stabilization does not have to satisfy comparatively exacting requirements. The voltage produced by this comparison can be used for biasing the oscillator transistor. This biasing is of the direction required to reduce the base current which flows during the forward stroke of the saw-tooth current, in case the output voltage exceeds a predetermined nominal value. Thus, the oscillator transistor is cut-off at a lower value of the collector peak current and the absorbed input energy is reduced.

In practice it must be ensured that the stabilizing arrangement does not interfere with the production of the required relaxation oscillations and that, in spite of the fact that the bias voltage is obtained from a voltage which occurs only during the fly-back periods, it is operative during the forward stroke periods. This can be ensured by means of an integrating network connected in the base circuit of the oscillator transistor.

In order that the invention may be readily carried into effect, it will now be described in detail with reference to the accompanying drawing, in which the embodiment shown in the single figure of the drawing contains a pnp junction transistor 1 the emitter 2 of which is connected to the positive terminal of a supply source 5, for example a battery of 3 volts. The collector 4 of said transistor is connected via the primary 6 of a transformer 7 to the negative terminal of the battery 5. The base 3 of the transistor 1 is connected via a resistance 9, a secondary 8 of the transformer 7 and an integrating network 19, 20 to the positive terminal of the battery 5. The integrating network comprises a resistor 19 and a capacitor 20 connected in parallel. The collector 4 is also connected, via a rectifier 10, to an external load 12 with which a smoothing capacitor 11 is connected in parallel. The transformer 7 is provided with a third winding 13, one end of which is connected to the positive terminal of the battery 5 and the other end is connected to the emitter 15 of a stabilizing pnp junction transistor 14. The base 16 of the transistor 14 is connected via a reference voltage source 18, for example a battery, to the positive terminal of the battery 5. The positive terminal of the reference battery 18 is connected to the base 16. The voltage of the battery 18 is such that the base 16 of the transistor 14 is always at least slightly positive with respect to its collector 17. This collector is connected to the integrating network 19, 20 of the base circuit of the transistor 1.

When the supply voltage of the source 5 and the voltage of the reference battery 18 are applied to the circuit arrangement, a current begins to flow through the primary 6 via the transistor 1. This increasing current produces a negative voltage at the base end of the secondary 8 so that an emitter base current begins to flow as a result of which the voltage drop between the collector 4 and the emitter 2 becomes very low. Thus, substantially the entire voltage of the battery 5 is applied across the inductance of the primary 6. Consequently the current through the primary 6 increases substantially linearly so that a constant direct voltage is produced across the secondary 8. This results in the production of a substantially constant base current of a certain value. These conditions persist until the instant at which the collector current of the transistor 1 reaches the bend in the curve of the collector-current versus collector-voltage characteristic for grounded emitter connection which corresponds to said base current. When the bend of this characteristic is reached, the current through the primary 6 cannot increase further and, since the collector-emitter and base emitter circuits are coupled via the transformer 7, the base current now decreases so that the collector current also must decrease. Hence a positive voltage is generated in the secondary 8 which cuts off the transistor 1. The interruption of the current through the primary 6 produces a high negative voltage at the collector 4. This voltage produces a current which flows via the rectifier 10, charges the smoothing capacitor 11 and feeds the load 12. Thus, a direct voltage is produced which is negative with respect to the positive terminal of the battery 5. At the end of the fly-back period of the current through the primary 6 and the rectifier 10 the transistor 1 again conducts and the cycle of operation is repeated so that the circuit is self-oscillating.

It will be seen that in the absence of the third winding 13 and of the transistor 14 the voltage across the load 12 will depend upon the value of said load and upon the voltage of the battery 5.

The load voltage is stabilized by comparing the voltage produced across the third winding 13 with the reference voltage of the battery 18 by means of the transistor 14. When the result of this comparison is such that the emitter 15 becomes positive with respect to the base 16, the transistor 14 becomes conductive and a current flows from the third winding 13 through the emitter 15 to the collector 17 and through the resistor 19, so that a positive bias voltage for the base 3 is produced. Together with the capacitor 20, the resistor 19 constitutes an integrating network connected in the base circuit of the transistor 1 and the provision of this network results in that the control is operative during the entire supply or forward stroke period in spite of the fact that the control voltage can be derived from a voltage which is only produced during the fly-back period. In fact, the positive voltage is smoothed by the capacitor 20 to produce a control direct voltage for the base 3. This positive bias voltage reduces the base current of the transistor 1 so that the point at which the transistor 1 is cut-off now corresponds to a lower value of the collector current and the energy stored in the transformer 7 is reduced accordingly so that the output voltage across the load 12 is also reduced. Thus, the load voltage is substantially maintained at a value which is determined to a large extent by the reference voltage of the source 18 rather than by the value of the load resistance or of the voltage of the battery 5, and which varies to a much less extent with the voltage of the battery 5 and/or with the value of the load resistance 12.

In the circuit arrangement described, it may be desirable that the transistor 14 remains cut-off during normal operation of the circuit. This requirement may, for example, arise from the known facts that the value of the load resistance will remain constant and that the supply voltage will change by no more than is permissible for a specific practical purpose, but that it is nevertheless desired to protect the circuit arrangement against excess voltages in the eventuality that the load becomes inadvertently disconnected. Should this happen without the circuit arrangement being provided with the bias means in accordance with the invention, the energy withdrawn from the battery 5 would have to be dissipated within the circuit arrangement and permanent damage might be caused to the transistor 1. The circuit arrangement can be protected in this risk by means of the arrangement in accordance with the invention, even though the threshold value required to produce a stabilizing effect exceeds the normal working voltage. If, in this event, the load becomes disconnected, the voltage increase, rises above the threshold value, and the transistor 1 is polarized by the base bias voltage thereby produced, so that damage to the transistor 1 is avoided.

In the embodiment described the voltage compared with the reference voltage is taken from a separate auxiliary winding. However, this voltage may be taken from a winding which simultaneously fulfills a different purpose or from a part of such a winding.

Junction transistors of the opposite conductivity type may also be used, in which case a reversal of the polarity of the battery and like known changes must be incorporated in the circuit arrangement.

What is claimed is:

1. A circuit arrangement comprising a transistor oscillator comprising a first transistor having emitter, collector and base electrodes, means for producing an oscillatory output voltage at said collector electrode, means for deriving said output voltage from said collector electrode and means for rectifying said output voltage, and means for stabilizing the voltage across said output voltage deriving means comprising a source of substantially constant reference voltage, means for comparing a portion of said output voltage with the voltage of said reference voltage source to produce a control voltage, said comparing means comprising a second transistor having emitter and base electrodes forming an emitter-base circuit and means for applying said portion of said output voltage in series circuit arrangement with the said reference voltage source, said series circuit arrangement being connected in series between said emitter and base electrodes in said emitter-base circuit, and means for controlling the base current of said first transistor in accordance with said control voltage thereby to maintain said output voltage substantially constant.

2. A circuit arrangement comprising a transistor oscillator comprising a first transistor having emitter, collector and base electrodes, a first inductive circuit interposed between said emitter and collector electrodes and comprising a first inductive winding, a source of supply voltage connected in series circuit arrangement with said first winding between said emitter and collector electrodes, a second inductive circuit interposed between said emitter and base electrodes and comprising a second inductive winding, said first and second windings being inductively coupled in feedback relationship thereby producing current flow between said emitter and collector electrodes whereby an oscillatory output voltage is produced at said collector electrode, means for deriving said output voltage from said collector electrode and means for rectifying said output voltage, and means for stabilizing the voltage across said output voltage deriving means comprising a second transistor having emitter, collector and base electrodes, a third inductive circuit comprising a third inductive winding inductively coupled to said first winding, a source of substantially constant reference voltage connected in series circuit arrangement with said third winding between the emitter and base electrodes of said second transistor whereby a portion of said output voltage of said oscillator is compared with the voltage of said reference voltage source and the emitter-collector current of said second transistor is controlled in accordance with the result of such comparison, said emitter-collector current providing a control voltage, and means for controlling the base current of said first transistor in accordance with said control voltage thereby to maintain said output voltage substantially constant.

3. A circuit arrangement comprising a transistor oscillator comprising a first transistor having emitter, collector and base electrodes, a first inductive circuit interposed between said emitter and collector electrodes and comprising a first inductive winding, a source of supply voltage connected in series circuit arrangement with said first winding between said emitter and collector electrodes, a second inductive circuit interposed between said emitter and base electrodes and comprising a second inductive winding, said first and second windings being inductively coupled in feedback relationship thereby producing current flow between said emitter and collector electrodes whereby an oscillatory output voltage is produced at said collector electrode, means for deriving said output voltage from said collector electrode and means for rectifying said output voltage, and means for stabilizing the voltage across said output voltage deriving means comprising a second transistor having emitter, collector and base electrodes, a third inductive circuit comprising a third inductive winding inductively coupled to said first winding, a source of substantially constant reference voltage connected in series circuit arrangement with said third winding between the emitter and base electrodes of said second transistor, an integrating network connected in series circuit arrangement with said second winding between said emitter and base electrodes of said first transistor, means connecting said third winding series circuit arrangement with that of said second winding and means connecting the collector electrode of said second transistor to said integrating network.

References Cited in the file of this patent

UNITED STATES PATENTS

| | | |
|---|---|---|
| 2,297,498 | Prast | Sept. 29, 1942 |
| 2,485,652 | Parker | Oct. 25, 1949 |
| 2,476,323 | Rack | July 19, 1949 |
| 2,565,621 | Olson | Aug. 28, 1951 |
| 2,679,594 | Fromm | May 25, 1954 |